Nov. 25, 1952 W. P. BOVARD 2,619,517
CABLE OUTLET HEAD
Filed Aug. 13, 1948 2 SHEETS—SHEET 1
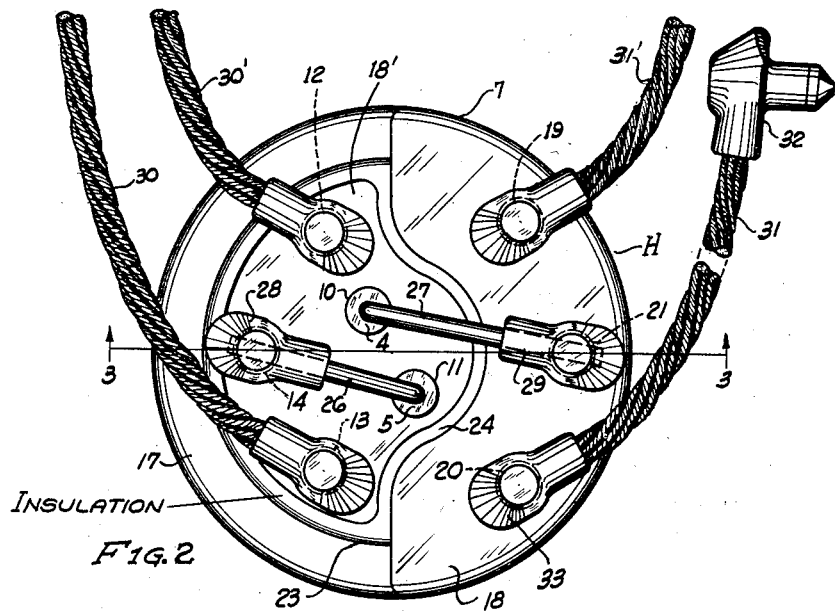
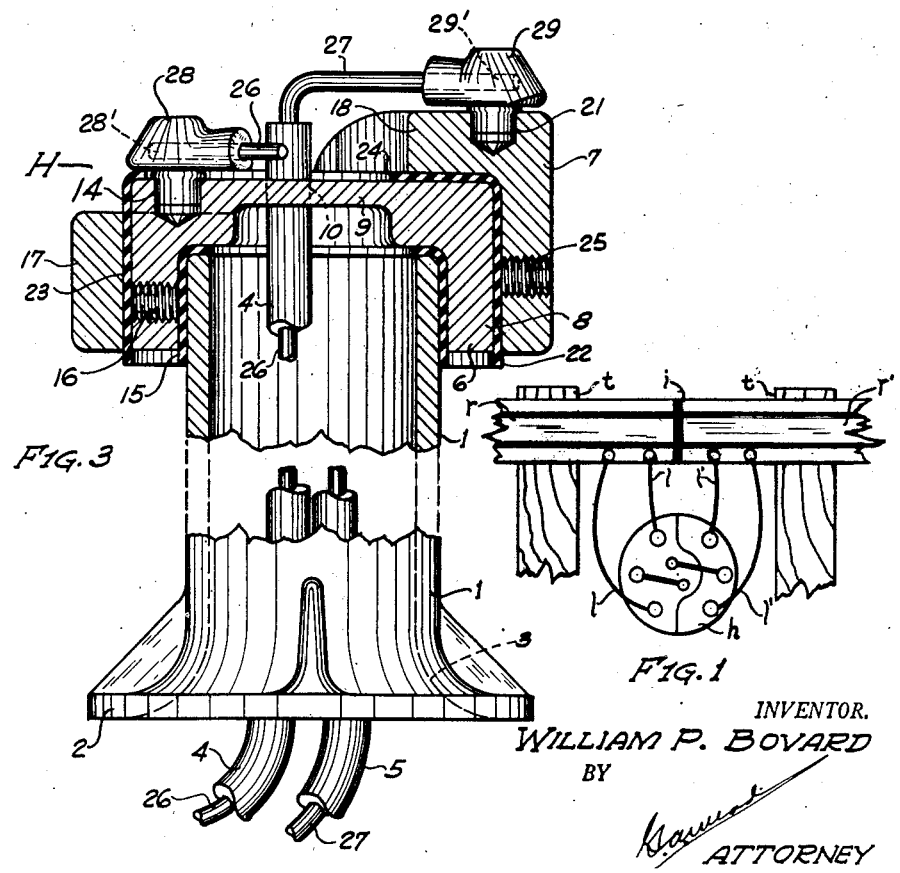
INVENTOR.
WILLIAM P. BOVARD
BY
ATTORNEY Nov. 25, 1952 W. P. BOVARD 2,619,517
CABLE OUTLET HEAD
Filed Aug. 13, 1948 2 SHEETS—SHEET 2

INVENTOR.
WILLIAM P. BOVARD
BY
ATTORNEY

Patented Nov. 25, 1952

2,619,517

UNITED STATES PATENT OFFICE 2,619,517

CABLE OUTLET HEAD

William P. Bovard, Mansfield, Ohio, assignor to The Ohio Brass Company, Mansfield, Ohio, a corporation of New Jersey Application August 13, 1948, Serial No. 44,101

13 Claims. (Cl. 174—75)

This invention relates to pot-heads or parkway outlets and its main purpose is to bring the ends of underground cables to the surface of the ground and in the case of railways to a point adjacent to the track.

Another object of this invention is to provide a single pot-head arranged to take care of two independent circuits and keep them electrically independent.

This is an important feature of such a device and represents a vital problem in preserving the continuity of such circuits which are subject to moisture, freezing, ballast handling and tamping, and vibrations in case of passing trains.

Where the track is divided into circuits by the well known means of insulated joints and it is desirable to connect a cable to each of the two circuits resulting from the use of such joints and the connections to the rails made at the adjacent ends of such insulated sections, it is far more convenient, less expensive and more practical to use a single pot-head for the two cables in place of employing two pot-heads as is the present practice, one for each cable, and placing the two pot-heads alongside of each other.

The device herein described and claimed provides a conduit through which the underground cables may be led to the surface of the ground and as much above the ground as desired and provides an external means or head which may be made of non-corrosive metal to which the ends of the cables may be secured and their conductors maintained in insulated relation and the device further provides a head to which the track wires or connecting leads may be electrically connected to their respective underground cables and at a point adjacent the connection of the leads to the rails.

Other objects of the invention relate to various details of construction and arrangement of parts which are shown in the drawings, described in the specification and more specifically set forth in the claims.

In Fig. 1 is shown a single pot-head arrangement in which $r$ and $r'$ represent two rails mounted on ties $t$ and separated by an insulating member $i$. The outlet head $h$ shows two track leads extending to each rail, $l$ from one cable and $l'$ from the other cable.

Fig. 2 is a top plane view of the outlet head of my improved pot-head together with a plurality of track leads from each of two independent circuits.

Fig. 3 is a vertical view on partial section of this invention taken on the line 3—3 of Fig. 2 and showing the head mounted on a standard.

In a preferred embodiment of this invention a standard 1 is provided having a foot portion 2 which anchors the standard in the ground. The height of the standard may vary as required. The standard is usually of cast metal such as iron but may be pipe secured to a cast base or of some non-corrosive metal. The lower inner edge 3 of the standard is curved or rounded to prevent injury to the cables 4 and 5.

Figure 4:
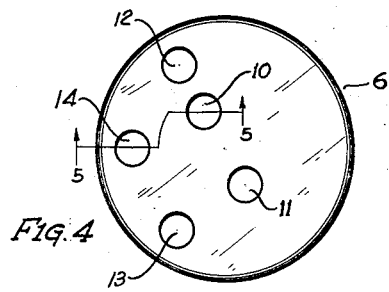
Fig. 4 is a top view of the inner outlet head member.
Figure 8:
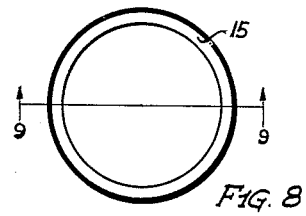
Figs. 8 and 9 show a top view and a sectional view on line 9—9 of Fig. 8, respectively, of the inner insulating member.
Figure 5:
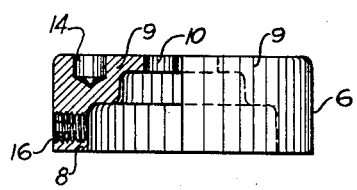
Fig. 5 is a side view in partial section of the inner head member taken on line 5—5 of Fig. 4.
Figure 9:
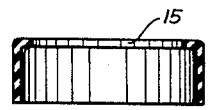
Figure 6:
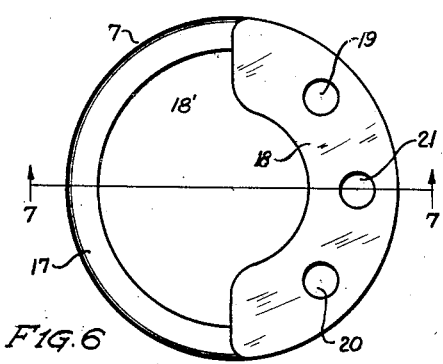
Fig. 6 is a top view of the outer outlet head member.
Figure 10:
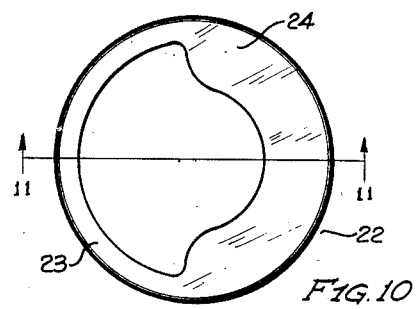
Figs. 10 and 11 show a top view and a sectional view on line 11—11 of Fig. 10, respectively of the outer insulating member.
Figure 7:
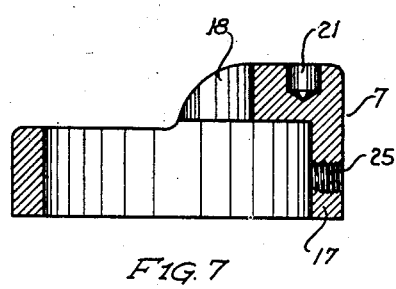
Fig. 7 is a side view in partial section of the outer head member taken on the line 7—7 of Fig. 6.
Figure 11:
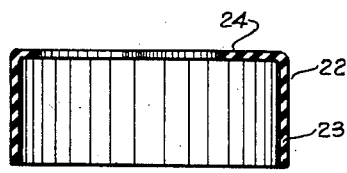

The device shown in Figs. 2 and 3 is substantially two-thirds size while the parts shown in Figs. 4 to 11 inclusive are of much more reduced size.

Mounted on the upper end of the standard is an outlet head H which includes two outlet members 6 and 7 hereinafter referred to respectively as inner outlet member or inner member and outer outlet member or outer member.

The inner outlet member 6 is an inverted cup-shaped body provided with a flange portion 8 which encircles the upper end of the standard in spaced relation thereto and has a cover portion 9 which substantially closes the top opening of the standard.

The inner outlet member 6 is provided with two openings 10 and 11 through which project the cables 4 and 5 respectively. The cables are of the insulated type and as far as possible the openings 10 and 11 are preferably of such size as to permit the insulation of the cables to just pass through the openings and substantially close same. This closes the end of the standard and the insulation of the cable cushions the cable conductor against vibration.

The inner member 6 is shown as provided with a plurality of blind recesses 12, 13 and 14.

Interposed between the standard 1 and the inner member 6 is an insulating sleeve 15 formed preferably of fibre and fitting the standard fairly snugly and the inner outlet member 6 fits over the insulating sleeve 15 fairly snugly.

To lock the inner member 6 and sleeve 15 to the standard, the flange 8 is provided with a consealed socket type set screw 16 which does not project outward from the flange 8.

Mounted on the inner member 6 is the outer outlet member 7 having a flange 17 and a partial cover 18 leaving the opening 18'. The cover portion is shown as provided with a plurality of blind recesses 19, 20 and 21 as above.

Interposed between the inner outlet member 6 and the outer outlet member 7 is an insulating member 22 having a flange 23 and an inwardly projecting cover flange 24 which insulates the partial cover 18 from the cover portion 9.

To secure the outer member 7 and the insulating member 22 to the inner member, the flange 17 is provided with a socket type set screw 25.

If the recesses 12, 13 and 14, and 19, 20 and 21, are blind they are usually drilled substantially ⅜ inch diameter and from ¼ to ⅚₁₆ inch in depth along the straight side.

The conductors 26 and 27 of the cables 4 and 5, respectively, are shown as connected to the members 6 and 7, respectively, by means of the drive terminals or connectors 28 and 29, respectively. These drive terminals or connectors may be of the construction shown and described in U. S. Patents 2,166,655 and 2,232,999 and are especially adapted for connecting the conductors 26 and 27 to their respective members 6 and 7 since it is only necessary for the customer when installing the pot-head to insert the conductors 26 and 27 in the drilled openings 28' and 29' therefor in the terminals 28 and 29 respectively and then insert the expansible stud portion of the terminals in the recesses 14 and 21 and then apply hammer blows to the head of the terminal which simultaneously tightens the terminal onto the conductor and expands the stud in the recess thus making a simple and efficient attachment of the conductors 26 and 27 to the members 6 and 7.

If the recesses are formed quite deep or without a bottom wall then a connector with a pin expanded stud as shown in U. S. Patent 565,672 may be used.

The inner and outer outlet members 6 and 7 are connected to their respective rails (Fig. 1) by means of extra long bonds or by track or connecting leads 30—30' and 31—31' and these bonds or leads may be of the construction disclosed and described in the patents supra. In Fig. 2 the bond 31 is shown complete with terminal 32 for attaching to the rail and terminal 33 attached to the member 7 and it will be understood that the other bonds or leads 30, 30' and 31' are also provided with like terminals or connectors for attachment to the rails.

These bonds or connecting leads 30—30' and 31—31' may be furnished complete to the customer or he may purchase the terminals and furnish his own flexible conductor which should be preferably of high-strength or hard-drawn Phosphor bronze as described in U. S. Patent 2,232,999 but in either case the terminals or connectors are installed in both the members 6 and 7 and the rails as described for the terminals 28 and 29 by means of a few hammer blows.

It is desirable to make the inner and outer outlet members of a non-corrosive material, such as copper, brass or bronze, and the use of two track leads from the pot-head to each rail as shown is a safeguard against an open circuit should one track lead be broken. However, a single tracklead per rail is sufficient as long as intact.

The use of the hammer type of terminal has proven its efficiency, practicability and simplicity as a connection especially when compared with the more complicated solder connection or the bolted type which soon corrodes.

If the track leads are damaged by dragging equipment or otherwise, it has been proved a simple matter to withdraw the terminals from the rail and pot-head and replace the lead or leads with new ones of the hammer type.

The members 6 and 7 may be arranged to receive other forms of terminals or means for attaching the conductors to the members but the hammer type terminal shown and described is preferred. The term hammer type terminal or hammer terminal includes any form of terminal which is applied to the head or to the conductor or both by means of a hammer.

The members 6 and 7 may each be provided with means for the attachment thereto of only one lead or more than two as found necessary.

While I have shown two cables 4 and 5 with a separate opening through the member 6, a single opening of proper size and shape will suffice.

In Fig. 1 the pot-head is shown as positioned on the inside of the track, that is as between rails and the leads $l$ and $l'$ as connected to the rail base, but the pot-head may also be placed outside the track rails and the leads $l$—$l'$ connected to the head of the rails.

Modifications of the herein described pot-head will suggest themselves to those skilled in the art based on the disclosure, therefore it is to be understood the construction described is merely illustrative of a single embodiment.

I claim:

1. An outlet head for a pot-head comprising an inverted cup-shaped inner member of conducting material adapted to be mounted on a hollow standard, the top wall of the inner member provided with a pair of openings therethrough adjacent its center for the passage of a pair of cables from within the standard, the top wall of the inner member provided with a plurality of blind recesses, each recess adapted to receive the expansible stud of a connector, an insulating sleeve within the inner member to insulate the member from the standard, an outer member of conducting material mounted on the inner member and having a sleeve portion surrounding the side wall of the inner member and a top portion covering a part of the top wall of the inner member, an insulating member interposed between the inner and outer members, the top portion of the outer member provided with a plurality of blind recesses, each recess adapted to receive the expansible stud of a connector, and means associated with the said inner and outer members to secure the members together and to the standard.

2. An outlet head for a pot-head comprising an inverted cup-shaped inner member of conducting material adapted to be mounted on a standard, the top wall of the inner member provided with a pair of openings therethrough for the passage of a pair of cables and also provided with a plurality of blind recesses, each recess adapted to receive the expansible stud of a connector, an insulating sleeve mounted within the inner member, an outer member of conducting material mounted on the inner member and having a top portion covering a part of the inner member, an insulating member positioned between the inner and outer members, the top portion of the outer member provided with a plurality of blind recesses each adapted to receive the expansible stud of a connector and means associated with the outer member to secure the inner and outer and insulating members together.

3. An outlet head for a pot-head comprising an inverted cup-shaped inner member of conducting material adapted to be mounted on a support, the top wall of the cup-shaped inner member provided with a pair of openings therethrough for the passage of a pair of cables, an outer member of conducting material mounted on the inner member said outer member having a top portion covering a part of the top wall of the inner member and having a side portion adjacent to and surrounding a portion of the side of said inner member, the exposed portion of the top wall of the inner member and the top portion of the outer member each provided with a plurality of openings to receive means for attaching conductors to the members, insulating means between the inner and outer members to electrically separate same and means to maintain the inner and outer and insulating members in assembled relation.

4. An outlet head for a pot-head comprising an inner member of conducting material adapted to be mounted on a standard and an outer member of conducting material adapted to be mounted on the inner member in telescopic relation thereto, said inner and outer members being annular and the outer member being of increased inside diameter to receive the inner member, insulating means interposed between the members to maintain them electrically separated and means to maintain the members and the insulating means in assembled relation, and means on the inner and outer members to receive connector means to attach at least one conducting lead to each member and one member provided with open means therethrough for the passage of a pair of cables and means on the inner and outer member to receive connector means to attach the cable conductors to the members, one conductor to each member.

5. An outlet head for a pot-head comprising an inner member and an outer member detachably mounted on the inner member, each member formed of conducting material and an interposed insulating sleeve to maintain the members in electrical separation, the inner member being of an inverted cup-shaped form adapted to receive the end of a support, the outer member having means encircling the inner member and other means covering a part of the top wall of the inner member, means on each member to receive means for securing a plurality of conductors thereto, one member having open means therethrough for the passage of a pair of cables.

6. A cable outlet head comprising a cup-shaped inner member adapted to be secured to a support in insulated relation thereto, an outer member secured to the inner member in superimposed, telescoped and insulated relation thereto and having an enlarged opening and each member provided with means to receive conductor attaching means, said inner member having a side portion surrounded by the inner portion and having a portion of its base exposed through the enlarged opening in the outer member.

7. In a cable outlet head having a cup-shaped conducting member and means to secure the conducting member to a support in insulated relation thereto, the combination therewith of a second conducting member telescopically associated with the first conducting member and means to secure the members together in insulated relation, the second member being of increased inside diameter to receive the cup-shaped member, and the said members each provided with a plurality of openings having an end wall and a side wall to receive the expansible projection of a connector whereby the said projection will be expanded when external force is applied to the connector thus forcing the expansible projection against the said end wall and expanding the projection into engagement with the side wall of the opening.

8. In a cable outlet head having a cup-shaped conducting member and means to secure the conducting member to a support in insulated relation thereto, the combination therewith of a second conducting member telescopically associated with the first conducting member and means to secure the members together in insulated relation, the second member being of increased inside diameter to receive the cup-shaped member, and the said members each provided with a plurality of openings having a side wall to receive the expansible projection of a connector whereby the said projection will be expanded when force is applied to the projection thus expanding the projection and forcing it into engagement with the side wall of the opening.

9. An outlet head for the end of a hollow standard for a pair of cables comprising, an inner member of conducting material adapted to close the end of the standard, means to secure the member to the standard in insulated relation thereto, the inner member provided with an exposed portion, the exposed portion provided with a pair of through openings through which the cables may project and also provided with a blind recess, an outer member mounted on the inner member in insulated relation thereto and having a portion overlapping the unexposed portion of the inner member, the overlapping portion provided with a blind recess, each blind recess adapted to receive a projection on a connector expansible into gripping engagement with the side wall of the recess.

10. In a cable outlet head having a cup-shaped conducting member and means to secure the conducting member to a support in insulated relation thereto, the combination therewith of a second conducting member telescopically associated with the first conducting member and means to secure the second member to the first said member in insulated relation thereto, the second member being of increased inside dimension to receive the cup-shaped member, one of the said members provided with a plurality of recesses each having a side wall and the second said member having a recess with an end wall and a side wall, the said recesses each arranged to receive the expansible projection on a conductor connector whereby the expansion of the said projection will force the connector into engagement with the side wall of the recesses.

11. In combination, a hollow standard, an outlet head comprising an inner member mounted on an end of the standard in insulated relation thereto, means to secure the member to the standard, an outer member mounted on the inner member in insulated relation thereto, the outer member comprising a top portion covering a part of the top portion of the inner member and having means to secure the outer member in position on the inner member, one member having opening means therethrough and through which a plurality of cables may project from within the standard, the members each provided with recesses and connector means secured to the conductor of each cable, each connector means having an expansible part positioned in the said recesses and therein secured, one recess in each member, connecting leads extending from the outlet head and connector means associated with each lead and secured in other recesses whereby the leads are electrically connected to the members, one lead to each member.

12. In an outlet installation for a pair of underground cables, the combination of a hollow support, a pair of insulated cables extending through the support, an inner member of metal mounted on one end of the support in insulated relation thereto, the member provided with a portion to substantially close the end of the support, a part of the closing portion of the inner member provided with opening means through which the cables project and also having a pair of blind recesses, an outer member of metal mounted on the inner member in insulated relation thereto and having a portion overlapping a part of the inner member other than the said exposed part, the said overlapping portion having a pair of blind recesses, the conductor of each cable having a connector secured thereto and each connector having an expansible projection positioned in two of the recesses, one recess in the inner member and the other recess in the outer member and the stud expanded into engagement with the side wall of the recesses, a pair of connecting leads provided with means at one end to attach the leads to a pair of rails and a connector secured to the other end of each connecting lead, the last said connectors each provided with an expansible projection positioned in the other two recesses and expanded into engagement with the side walls thereof, whereby the underground cables are electrically connected to the connecting leads.

13. A cable outlet head comprising a cup-shaped inner member adapted to receive a support in insulated relation thereto, an outer member secured to the inner member in super-imposed, telescoped and insulated relation thereto and having an enlarged opening, and each member being provided with means to receive conductor attaching means, said inner member having a side portion surrounded by the outer member and having a portion of its base projecting through the enlarged opening in the outer member, and said conductor attaching means associated with the inner member being located in the projecting portion of its base.

WILLIAM P. BOVARD.

REFERENCES CITED

The following references are of record in the file of this patent:

UNITED STATES PATENTS

| Number | Name | Date |
| --- | --- | --- |
| 477,951 | Mezger | June 28, 1892 |
| 565,672 | Daniels | Aug. 11, 1896 |
| 2,002,034 | Laser | May 21, 1935 |
| 2,099,526 | Lavarack | Nov. 16, 1937 |
| 2,225,117 | Jefferson | Dec. 17, 1940 |

FOREIGN PATENTS

| Number | Country | Date |
| --- | --- | --- |
| 7,247 | England | Oct. 20, 1904 |
| 193,824 | Switzerland | Oct. 31, 1937 |